US008090523B2

(12) United States Patent
Takeuchi et al.

(10) Patent No.: US 8,090,523 B2
(45) Date of Patent: Jan. 3, 2012

(54) TRAVEL-TIME PREDICTION APPARATUS, TRAVEL-TIME PREDICTION METHOD, TRAFFIC INFORMATION PROVIDING SYSTEM AND PROGRAM

(75) Inventors: Junichi Takeuchi, Tokyo (JP); Takayuki Nakata, Tokyo (JP); Takashi Fujita, Tokyo (JP); Yasuhiro Sugisaki, Tokyo (JP)

(73) Assignees: NEC Corporation, Tokyo (JP); NEC Soft, Ltd., Tokyo (JP)

( * ) Notice: Subject to any disclaimer, the term of this patent is extended or adjusted under 35 U.S.C. 154(b) by 1081 days.

(21) Appl. No.: 11/907,567

(22) Filed: Oct. 15, 2007

(65) Prior Publication Data

US 2008/0097686 A1 Apr. 24, 2008

(30) Foreign Application Priority Data

Oct. 20, 2006 (JP) ................................ 2006-286551
Feb. 14, 2007 (JP) ................................ 2007-033769

(51) Int. Cl.
*G06F 19/00* (2006.01)

(52) U.S. Cl. .................................. 701/117; 340/995.13

(58) Field of Classification Search .................. 701/117, 701/118, 119; 340/906, 995.13
See application file for complete search history.

(56) References Cited

U.S. PATENT DOCUMENTS 7,577,513 B2 * 8/2009 Kumagai et al. .............. 701/117
2004/0119609 A1 * 6/2004 Solomon ....................... 340/928
2005/0119010 A1 * 6/2005 Yasukawa .................. 455/456.3
2005/0206534 A1 * 9/2005 Yamane et al. ............... 340/994
2006/0106530 A1 * 5/2006 Horvitz et al. ................ 701/117
2006/0111833 A1 * 5/2006 Feldman et al. .............. 701/117

FOREIGN PATENT DOCUMENTS

JP 63-49999 A 3/1988
JP 2000-235692 A 8/2000
JP 2002-148067 A 5/2002
JP 2003-303390 A 10/2003
JP 2004-29871 A 1/2004
JP 2004-118700 A 4/2004
JP 2005-208034 A 8/2005

(Continued)

OTHER PUBLICATIONS

T. Kamishima, "A Survey of Recent Clustering Method for Data Mining (Part 1)," National Institute of Advanced Industrial Science and Technology (AIST), vol. 18:1, 2003, pp. 59-65.

(Continued)

*Primary Examiner* — Mark Hellner
(74) *Attorney, Agent, or Firm* — Foley & Lardner LLP

(57) ABSTRACT

Disclosed is a travel-time prediction apparatus that is capable of making a mid-term prediction of travel time accurately by combining present conditions and statistical information. The apparatus includes a travel-time transition pattern database storing travel-time transition patterns obtained by statistically processing past time-series data of each road link according to type of data. Upon accepting a travel-time transition pattern corresponding to a specified link and day type from the database, the apparatus calculates conversion parameters of a travel-time transition pattern for which an error between the travel-time transition pattern and a sequentially input travel-time time-series data will be reduced, and then makes a prediction using a prediction function obtained by converting the travel-time transition pattern by the calculated conversion parameters. The calculated predicted value and the conversion parameters are distributed as traffic information.

14 Claims, 10 Drawing Sheets

FOREIGN PATENT DOCUMENTS

| | | | |
|---|---|---|---|
| JP | 2005-227972 | A | 8/2005 |
| JP | 2006-011572 | A | 1/2006 |
| JP | 2006-18435 | A | 1/2006 |

OTHER PUBLICATIONS

M. Kumagai et al., "Traffic Information Prediction Method Based on Feature Space Projection," IPSJ SIG Technical Report No. 014-009, 2003, pp. 51-57.

T. Nakata et al., "Hierarchical State Space Mode for Long-term Prediction," Eighth Information-Based Induction Sciences, 2005, 6 pp.

K. Yamanishi, "A Decision-Theoretic Extension of Stochastic Complexity and Its Applications to Learning," IEEE Transactions on Information Theory, vol. 44:4, Jul. 1998, pp. 1424-1439.

T. Kohonen, Springer-Verlag—Cover pages and contents of Japanese translation of English language edition: "Self-Organizing Maps", 2001.

* cited by examiner

TRAVEL-TIME PREDICTION APPARATUS, TRAVEL-TIME PREDICTION METHOD, TRAFFIC INFORMATION PROVIDING SYSTEM AND PROGRAM

REFERENCE TO RELATED APPLICATIONS

This application is based upon and claims the benefits of the priorities of Japanese patent application Nos. 2006-286551 filed on Oct. 20, 2006 and 2007-033769 filed on Feb. 14, 2007, the disclosure of which is incorporated herein in its entirety by reference thereto.

FIELD OF THE INVENTION

This invention relates to a travel-time prediction apparatus, travel-time prediction method, traffic information providing system and program. More particularly, the invention relates to an apparatus for predicting travel time (required time) provided as traffic information concerning a specific segment of road in an ITS (Intelligent Transport System), and to a system in which this apparatus is applied.

BACKGROUND OF THE INVENTION

In the field of ITS, various techniques are known for estimating/predicting travel time required for travel of a vehicle or traffic conditions such as occurrence of gridlock for the purpose of providing route guidance. In particular, probe-car systems, in which a vehicle itself is utilized as a sensor for acquiring road traffic information using vehicle-mounted equipment, have started to be used. Literature relating to these techniques will be set forth below.

The paper "Traffic Information Prediction Method on Feature Space Projection" by Kumagai et al. set forth in the IPSJ SIG Technical Report "Sophisticated Traffic System" No. 014-009 proposes a method of classifying one day of a travel-time fluctuation pattern into several categories by principal-component analysis, and correlates a category, to which a prediction-target day is to belong, based upon a label (day of the week or weather, etc) that represents the type of day. This method is a technique applied to prediction over a long-term range, namely half a day or one full day. Further, it is believed that a road segment in which prediction is possible by this method is limited to highways or the like where measurements can be made at fixed points.

In a "Travel-Time Prediction Apparatus" described in the specification of Japanese Patent Kokai Publication No. JP-P2000-235692A, there is disclosed a method of obtaining the ranking of current segment travel time in a travel-time cumulative distribution for every time period with regard to a travel-time prediction-target segment, obtaining a predicted ranking from this ranking and extracting travel time, which corresponds to the predicted ranking, from the travel-time cumulative distribution. Since a predicted value based upon this method depends greatly upon the ranking at the present time, it is believed that this technique is one suited to a prediction from the immediate future to about one hour ahead. Although application is possible if the segment of road is one on which measurements can be made at fixed points, it can be said that the method is suited to high-speed roads in terms of the characteristics of the above-described technique.

In "Travel-Time Prediction Method, Apparatus and Program" described in Japanese Patent Kokai Publication No. JP-P2003-303390A, use is made of a method of retrieving a travel-time transition pattern that resembles a current travel-time transition pattern from past current-time performance data that has been accumulated, and estimating travel time using the resembling travel-time transition pattern. It is believed that a segment in which prediction is possible by this method also is limited to highways or the like where measurements can be made at fixed points.

In a "Traffic Information Prediction-Function Learning Apparatus, Traffic Information Prediction Apparatus, Traffic Information Fluctuation Rule Acquisition Apparatus and Method Thereof" described in Japanese Patent Kokai Publication No. JP-P2006-11572A filed by the present applicant, there is proposed a method of analyzing, by an autoregression model, the difference between time-series data acquired from a probe-car system and a travel-time transition pattern created based upon past travel-time performance, and predicting travel time. Since this method is premised on data acquisition by a probe-car system and not measurement at fixed points, it is in principle applicable to all road segments but finds application in the prediction of travel time into the immediate future.

In a "Required Driving Time Prediction Apparatus" described in the specification of Japanese Patent Kokai Publication No. JP-P2004-118700A, travel time is predicted by combining a short-term prediction of required driving time utilizing predicted traffic data for that day and an intermediate-term prediction of required driving time based upon retrieval of a similar pattern. The apparatus of this publication is premised on use of data acquired from fixed sensors such as a vehicle sensor, AVI (Automatic Vehicle Identification) system and sensors at toll booths. Prediction along segments where these sensors have not been deployed is not considered.

In a "Matching Correction Method of Estimated Link Travel-Time Data" disclosed in Japanese Patent Kokai Publication No. JP-P2005-208034A, there is described a method in which travel-time data (past statistical data) of a segment relating to a period of from several hours to one day is modified based upon current-condition data to thereby perform prediction accurately over a period of from several tens of minutes to several hours. A segment over which a prediction is possible by this method is only a segment obtained from past statistical data and current-condition data in a manner similar to the techniques described above. This disclosure does not touch upon a prediction over all road segments.

[Patent Document 1]
Japanese Patent Kokai Publication No. JP-P2000-235692A
[Patent Document 2]
Japanese Patent Kokai Publication No. JP-P2003-303390A
[Patent Document 3]
Japanese Patent Kokai Publication No. JP-P2006-11572A
[Patent Document 4]
Japanese Patent Kokai Publication No. JP-P2004-118700A
[Patent Document 5]
Japanese Patent Kokai Publication No. JP-P2005-208034A
[Non-Patent Document 1]
IPSJ SIG Technical Report "Sophisticated Traffic System" No. 014-009, "Traffic Information Prediction Method on Feature Space Projection," pp. 51-57, Masatoshi Kumagai et al.
[Non-Patent Document 2]
IEEE Transactions on Information Theory, vol. 44, No. 4, pp. 1424-1439 "A Decision-Theoretic Extension of Stochastic Complexity and Its Applications to Learning," K. Yamanishi, 1998
[Non-Patent Document 3]
Eighth Information-Based Induction Sciences "Hierarchical State Space Model for Long-Term Prediction," Takayuki Nakata, Jun-ichi Takeuchi (2005)

SUMMARY OF THE DISCLOSURE

In the following analyses will be given by the present invention. The entire disclosure of Patent Documents 1-5 and Non-Patent Documents 1-3 is incorporated herein by reference thereto.

Although the foregoing techniques are applicable to prediction from the immediate future to about one hour ahead or to long-term prediction of from a half day to a full day, a problem is that good accuracy cannot be achieved in mid-term prediction over an intermediate period of time.

Further, Patent Document 5, for example, introduces a method of applying a correction in such a manner that a statistically processed statistical link travel time is made to match current traffic conditions. However, this correction processing is such that a statistical link travel time is multiplied by a ratio that conforms to the difference between this travel time and the current conditions. If gridlock happens to shift to a significantly earlier time, for example, subsequent travel time will shorten greatly. Thus, the prediction does not always conform to the actual circumstances.

Accordingly, it is an object of the present invention to provide a travel-time prediction apparatus, travel-time prediction method, traffic information providing system and program of the type in which the future is predicted from data in the immediate future.

According to a first aspect of the present invention, there is provided a travel-time prediction apparatus, to which are input a link specified as a prediction target from a set of all links, date and time of the prediction target and travel-time time-series data that is input sequentially in relation to the specified link, for outputting predicted travel time in the specified link and at the date and time, wherein the apparatus accepts a travel-time transition pattern corresponding to the specified link and day type from a database storing travel-time transition patterns obtained by statistically processing past time-series data of each link according to at least day type, calculates conversion parameters of a travel-time transition pattern for which an error between the travel-time transition pattern and sequentially input travel-time time-series data will be reduced, and makes a prediction using a prediction function obtained by converting the travel-time transition pattern by the calculated conversion parameters.

According to a second aspect of the present invention, there is provided a travel-time prediction method using a computer, to which are input a link specified as a prediction target from a set of all links, date and time of the prediction target and travel-time time-series data that is input sequentially in relation to the specified link, for outputting predicted travel time in the specified link and at the date and time, the method comprising the following steps executed by the computer: accepting a travel-time transition pattern corresponding to the specified link and type of day from a database storing travel-time transition patterns obtained by statistically processing past time-series data of each link according to at least day type; calculating conversion parameters of a travel-time transition pattern for which an error between the travel-time transition pattern and sequentially input travel-time time-series data will be reduced; obtaining a prediction function by converting the travel-time transition pattern by the calculated conversion parameters; and predicting and outputting predicted travel time in the specified link and at the date and time using the prediction function.

According to a third aspect of the present invention, there is provided a program executed by a computer, to which are input a link specified as a prediction target from a set of all links, date and time of the prediction target and travel-time time-series data that is input sequentially in relation to the specified link, for outputting predicted travel time in the specified link and at the date and time, said program causing the computer to execute the following processing: processing for accepting a travel-time transition pattern corresponding to the specified link and type of day from a database storing travel-time transition patterns obtained by statistically processing past time-series data of each link according to at least day type; processing for calculating conversion parameters of a travel-time transition pattern for which an error between the travel-time transition pattern and sequentially input travel-time time-series data will be reduced; processing for obtaining a prediction function by converting the travel-time transition pattern by the calculated conversion parameters; and processing for predicting and outputting predicted travel time in the specified link and at the date and time using the prediction function.

According to a fourth aspect of the present invention, there is provided a traffic information providing system connected to the above-described travel-time prediction apparatus and further having means for providing traffic information, which includes the predicted travel time that has been output from the travel-time prediction apparatus, to a prescribed terminal.

The meritorious effects of the present invention are summarized as follows.

In accordance with the present invention, it is possible to accurately predict travel time required for travel over any segment.

Other features and advantages of the present invention will be apparent from the following description taken in conjunction with the accompanying drawings, in which like reference characters designate the same or similar parts throughout the figures thereof.

PREFERRED MODES OF THE INVENTION

Preferred modes of the present invention will now be described in detail with reference to the drawings.

First Example

Figure 1:
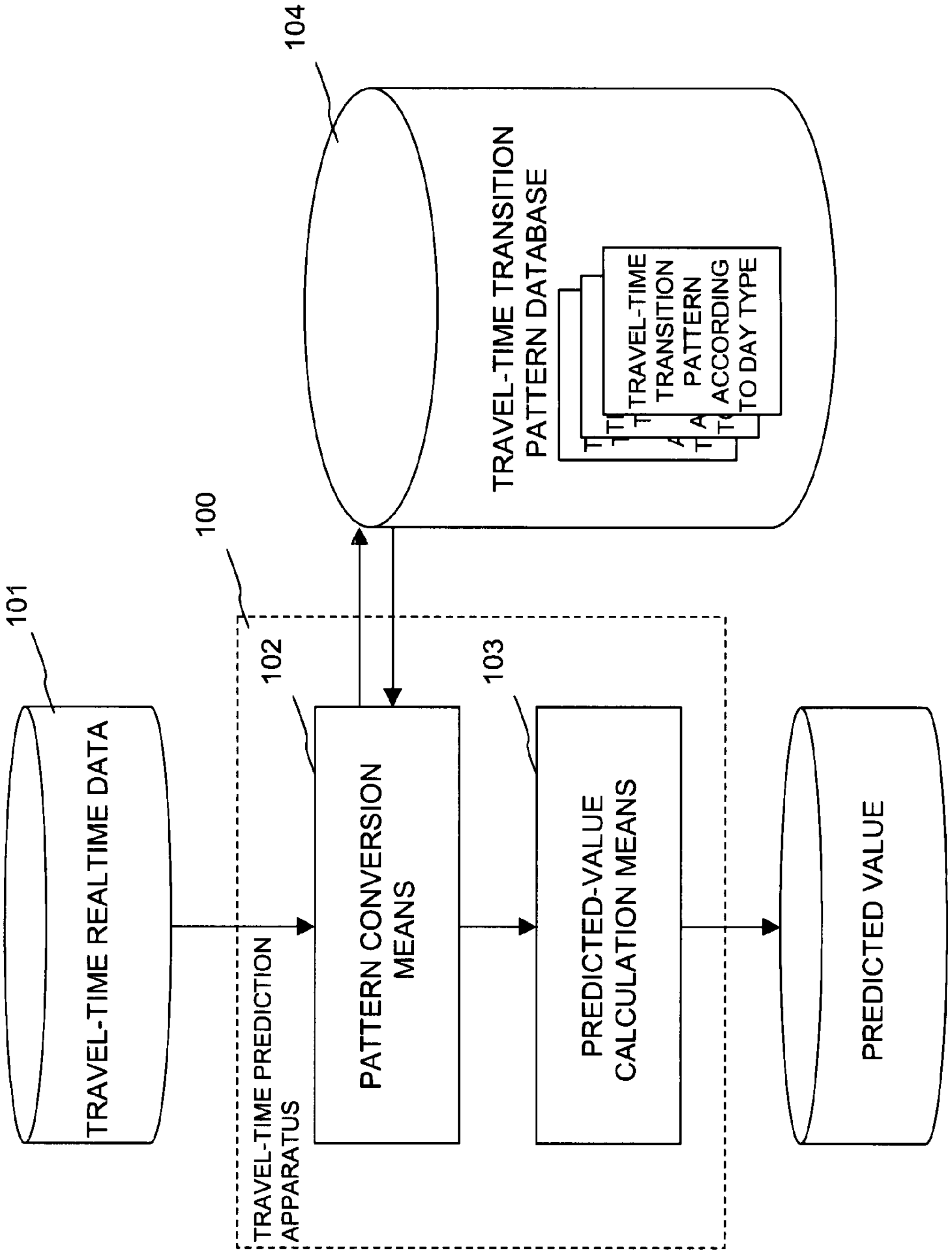
FIG. 1 is a diagram illustrating the overall configuration of a travel-time prediction system according to a first embodiment of the present invention.

FIG. 1 is a diagram illustrating the overall configuration of a travel-time prediction system according to a first example of the present invention. As shown in FIG. 1, the system includes a travel-time prediction apparatus 100 for outputting a predicted value upon accessing travel-time realtime data 101 and a travel-time transition pattern database 104.

The travel-time realtime data 101 is time-series data formed for every road-segment unit (link) from data in a probe-car system and an information source such as a VICS (Vehicle Information & Communication System®). The details will be described later.

Stored in the travel-time transition pattern database 104 with regard to each road-segment unit (link) are travel-time transition patterns obtained by subjecting various past index values over a prescribed time period to required statistical processing such as elimination of out-of-spec values and correlation analysis using the travel-time realtime data 101. The statistical processing is executed for every predetermined unit of time for every day type, such as day of the week, the fifth day of the month, season and weather, in the time-series data. Accordingly, travel-time transition patterns are prepared for a period of 24 hours and suitable patterns can be used in accordance with various circumstances. The unit of time is decided in accordance with prediction accuracy and the overall load of the system. Conceivable units of time are every five minutes and every 15 minutes, etc. The details of these travel-time transition patterns will be described later.

The travel-time prediction apparatus 100 includes pattern conversion means 102 and predicted-value calculation means 103 for executing prediction processing using a prediction function described later in detail. In accordance with a request from the user, the travel-time prediction apparatus 100 combines the travel-time realtime data 101 and travel-time transition patterns stored in the travel-time transition pattern database 104, obtains short-term (after 5 or 15 minutes) predicted time, mid-term (up to several hours from short-term onward) predicted time and future predicted time with respect to the road-segment unit (link) that is the target of the prediction, and outputs the predicted time. Here the road-segment unit (link) that is the target of the prediction basically is decided by being specified on the user side, and it is assumed that from several tens to several tens of thousands can be adopted as the target.

The travel-time prediction apparatus 100 is characterized by its mid-term prediction processing in order to shorten, as much as possible, the processing time needed for a prediction while the high accuracy of the prediction is maintained. The mid-term prediction processing of the travel-time prediction apparatus 100 will be described below.

[Travel-Time Realtime Data (Time-Series Data)]

The travel-time realtime data 101 used in mid-term prediction processing will be described first. Here the term "link" refers to a road segment typically having a length of from several tens of meters to several hundred meters defined between intersections, by way of example. The end of a link, such as an intersection, is referred to as a "node".

Assume that there are d-number of prediction-target links, and let a vector obtained by arraying realtime data of each link at time t be represented by $x_1=(x_{t:1}, x_{t:2}, \ldots x_{t:d})\in D=X_1\times X_2\times \ldots \times X_d$. Here D is referred to as a "domain".

Each $x_{t:1}$ is assumed to represent an index indicating travel time, number of vehicles and occurrence of gridlock in link i at time t, or an index value of various attributes relating to traffic conditions, such as weather at this time. Each $x_{t:1}$ is a continuous value or discrete value.

Let t be an integral value for the sake of convenience. Assume that time-series data over a predetermined time interval is constituted by a vector sequence $\{x_t\}$. For example, if the predetermined time interval is five minutes, then $x_2$ will represent the data of $x_1$ after five minutes. Let the sequence $x_m \ldots x_n$ be represented by $x_m{}^n(m\leqq n)$, and in particular, assume that $x^n=x_1{}^n$ holds.

[Travel-Time Transition Pattern]

Next, the travel-time transition patterns stored in the travel-time transition pattern database 104 will be described. A travel-time transition pattern at time t follows $x_t$ and is represented by $w_t$. Here we assume that $w_t$ is obtained by recording a past average value of a quantity corresponding to $x_t$ for every time period.

Since $w_t$ differs depending upon the day type, such as day of the week, weather and whether or not the day is a holiday, $w_t$ is formed according to each day type. Accordingly, it is assumed that $w_t$ has a periodicity in which the original value is restored when time advances by 24 hours.

The problem involved in forming $w_t$ is a problem involving the learning of a regression equation that correlates (time period, day type) to travel time. Various concrete methods of forming $w_t$ are conceivable. One example that can be mentioned is a method in which the problem of how finely day type and time period should be classified is solved as an optimization problem based upon an information-quantity criterion.

[Mid-Term Prediction]

Next, a mid-term prediction method will be described in detail using the travel-time realtime data (time-series data) and travel-time transition patterns.

In mid-term prediction, it is known empirically that one of the properties of travel time is that "if gridlock starts earlier, then the travel-time transition pattern will hasten correspondingly", and that another property is that "if travel time at a certain time is longer than usual, then a similar tendency will persist for a while".

Such a fluctuation conforms well to a period of from 30 minutes, which is the scope of a mid-term prediction, to one or two hours. The travel-time prediction apparatus 100 according to this example uses a prediction method that formulates the above-mentioned findings.

Figure 2:
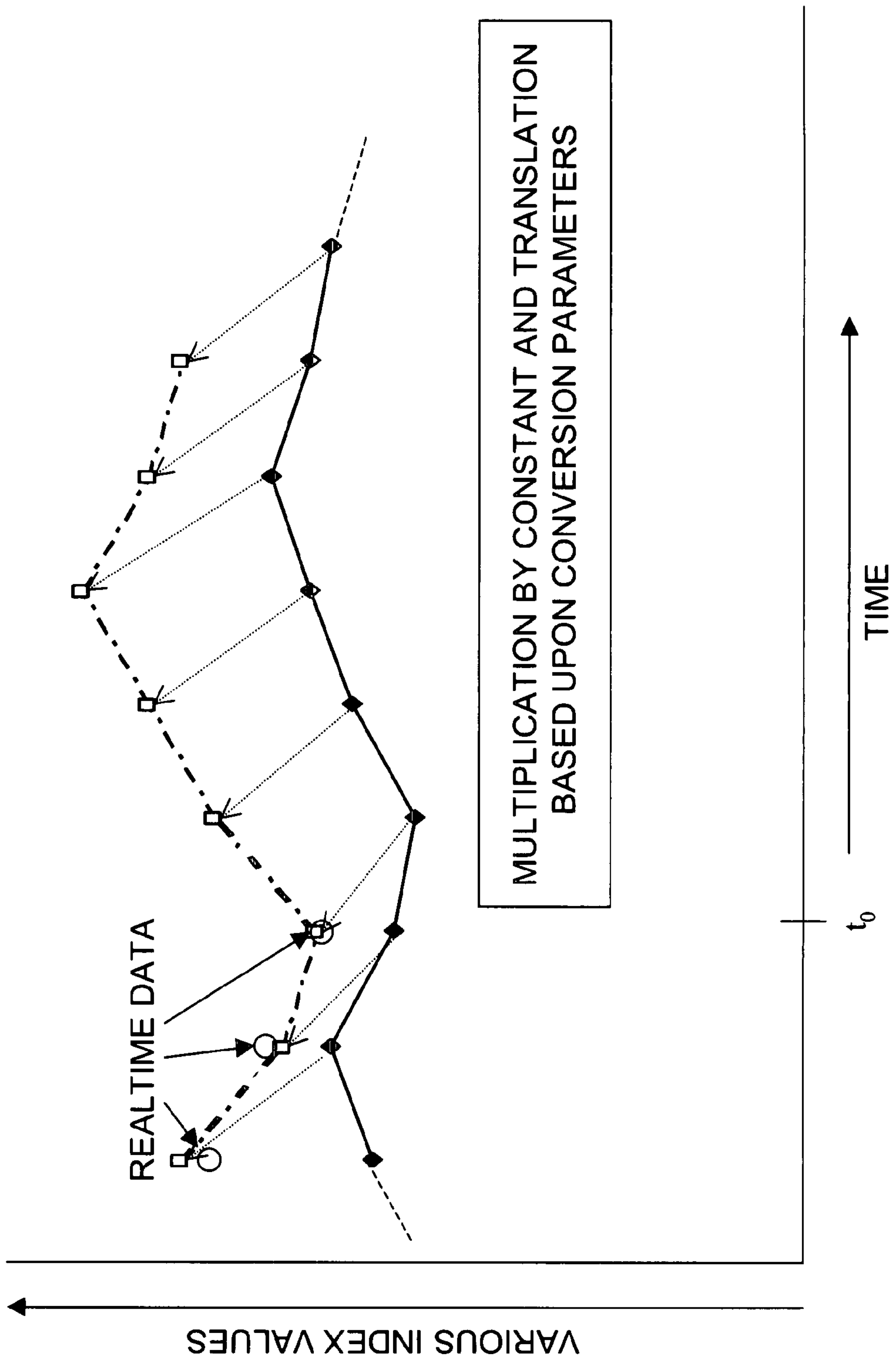
FIG. 2 is a graph representing the concept of a function conversion (multiplication by a constant and translation) in the travel-time prediction system according to the first embodiment.

If we assume for the sake of simplicity that either the road-segment unit (link) or day type is fixed and that the travel-time realtime data 101 travel-time transition patterns are one-dimensional time-series data comprising only one attribute "travel time", then travel time at time t found from past data that has been stored in the travel-time transition pattern database 104 can be expressed by f(t). Further, assume that the present time is $t_0$. Now travel time can be predicted by the prediction function $$h(t|a,b)=af(t-b)$$

in which a and b are conversion parameters. This prediction function is a function obtained by multiplying f(t) by a constant (by a factor of a) and translating it by (−b) so as to reduce the error relative to the realtime data, as illustrated in FIG. 2.

It should be noted that $\hat{a}(t_0)$ and $\hat{b}(t_0)$, which are obtained by the equation below that minimizes the error relative to the travel-time realtime data 101, are used as a and b, respectively.

$$(\hat{a}(t_0), \hat{b}(t_0)) = \underset{(a,b)}{\operatorname{argmin}} \sum_{u=t_0-k}^{t_0} (\exp(-\alpha(t_0-u))(x_u - h(u \mid a, b))^2 + w_a(1-a)^2 + w_b b^2) \quad \text{(Eq. 1)}$$

Figure 3:
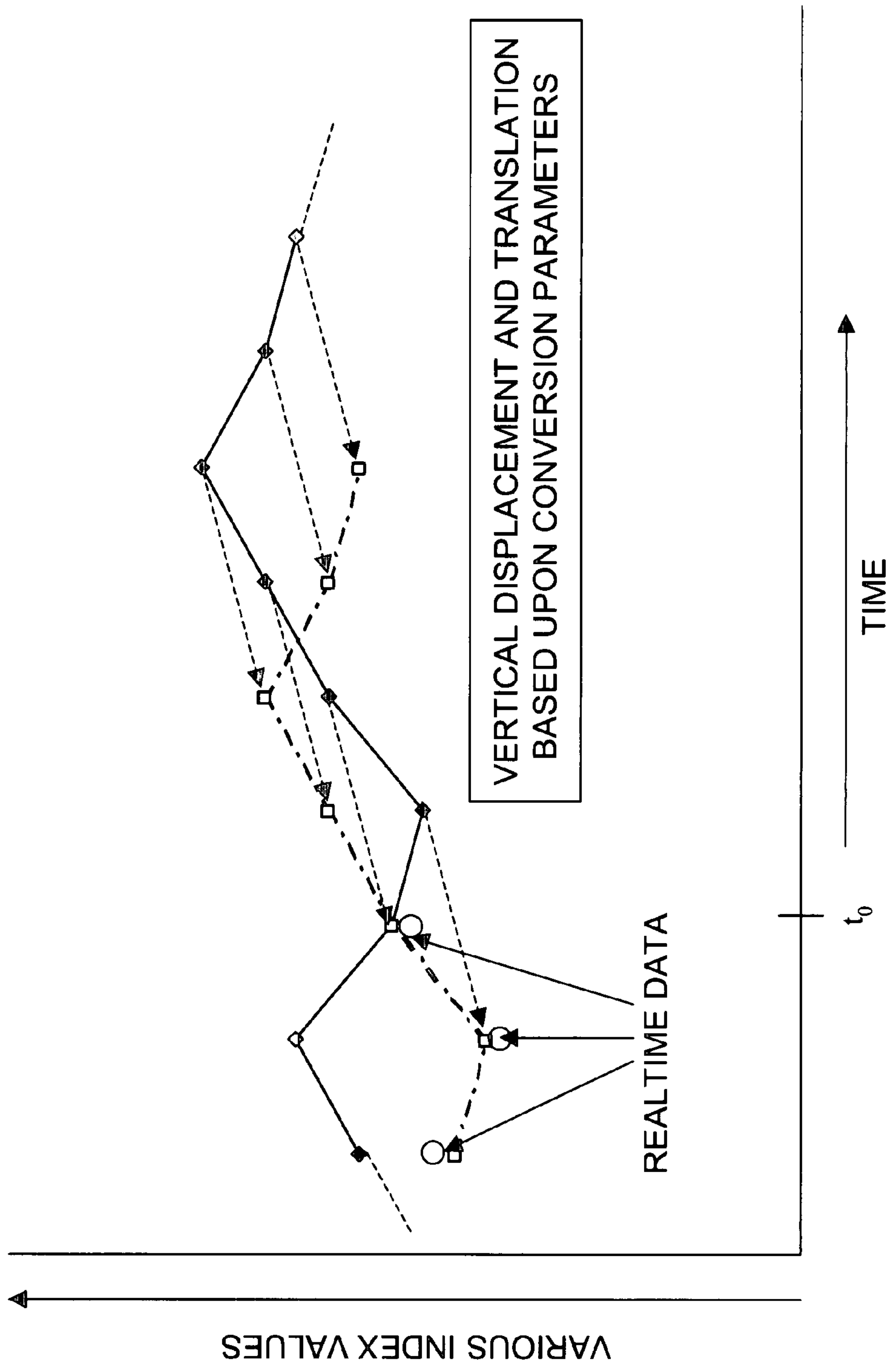
FIG. 3 is a graph representing the concept of a function conversion (vertical displacement and translation) in the travel-time prediction system according to the first embodiment.

Further, travel time can be predicted by the prediction function $$h(t|a,b)=f(t-b)+a$$

in which a and b are conversion parameters. This prediction function is a function obtained by vertically displacing f(t) by (+a) and translating it by (−b) so as to reduce the error relative to the realtime data, as illustrated in FIG. 3.

It should be noted that $\hat{a}(t_0)$ and $\hat{b}(t_0)$, which are obtained by the equation below that minimizes the error relative to the travel-time realtime data 101, are used as a and b, respectively.

$$(\hat{a}(t_0), \hat{b}(t_0)) = \underset{(a,b)}{\operatorname{argmin}} \sum_{u=t_0-k}^{t_0} (\exp(-\alpha(t_0-u))(x_u - h(u \mid a, b))^2 + w_a a^2 + w_b b^2) \quad \text{(Eq. 2)}$$

In Equations (1) and (2), $\exp[-\alpha(t_0-u)]$ is a weighting coefficient that multiplies the error $[x_u-h(u|a,b)]^2$ and that acts in such a manner that the more recent the data, the more importance is attached to it. That is, if we go back in time by $1/\alpha$ step from the present time $t_0$, the weight becomes a factor of 1/e. Therefore, if we consider a case where one step is five minutes, a conversion is made using data up to data that is several times $5/\alpha$ minutes in the past.

The penalty-term coefficients $w_a$ and $w_b$ of the second and third terms on the right side of Equations (1) and (2) are parameters that control how easily the function conversion tends to affect the past data.

These variables $\alpha$, $w_a$, $w_b$ are all parameters that control the nature of learning and are referred to as "hyperparameters". A specific value of $\alpha$ can be decided intuitively from $5/\alpha*3=120$, etc., in a case where one step is five minutes. Further, it will suffice if $w_a$, $w_b$ are decided to the same extent as the variance of the travel time.

Travel time after time s can be found from the present time $t_0$ by the equation below using the prediction function of Equation (1) or (2).

$$\hat{T}(t_0+s)=h(t_0+s|\hat{a}(t_0),\hat{b}(t_0)) \quad \text{(Eq. 3)}$$

With regard to the above-mentioned hyperparameters, it is possible to use values that have been optimized by the concept of the information-quantity criterion "predictive stochastic complexity". Predictive stochastic complexity is put into concrete form by the equation below, where m represents the number of records of time-series data contained in 24 to 78 hours. It should be noted that the details of "predictive stochastic complexity" are described in Non-Patent Documents 2 and 3, by way of example, the entire disclosure thereof being herein incorporated by reference thereto.

$$\sum_{u=t_0-m-s}^{t_0-s} \left(\hat{T}(u+s) - x_{u+s}\right)^2 \quad \text{(Eq. 4)}$$

Figure 4:
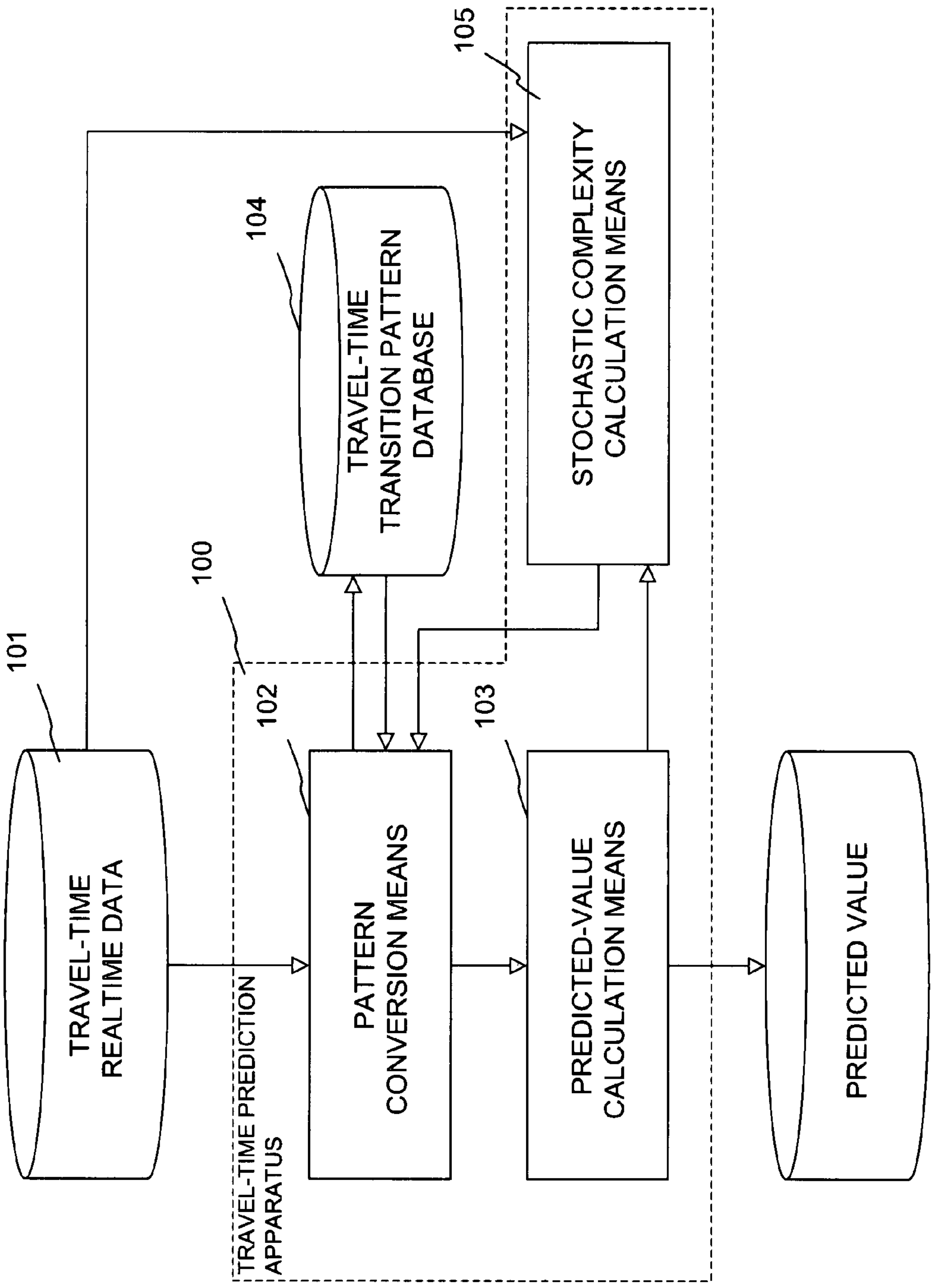
FIG. 4 is a diagram illustrating a modified arrangement in which stochastic complexity calculation means has been added to the first embodiment.

FIG. 4 is a diagram illustrating a travel-time prediction apparatus having stochastic complexity calculation means 105 for calculating stochastic complexity using the result of calculation from the predicted-value calculation means 103. In accordance with this arrangement, it is possible to derive conversion parameters employing predicting stochastic complexity.

Figure 5:
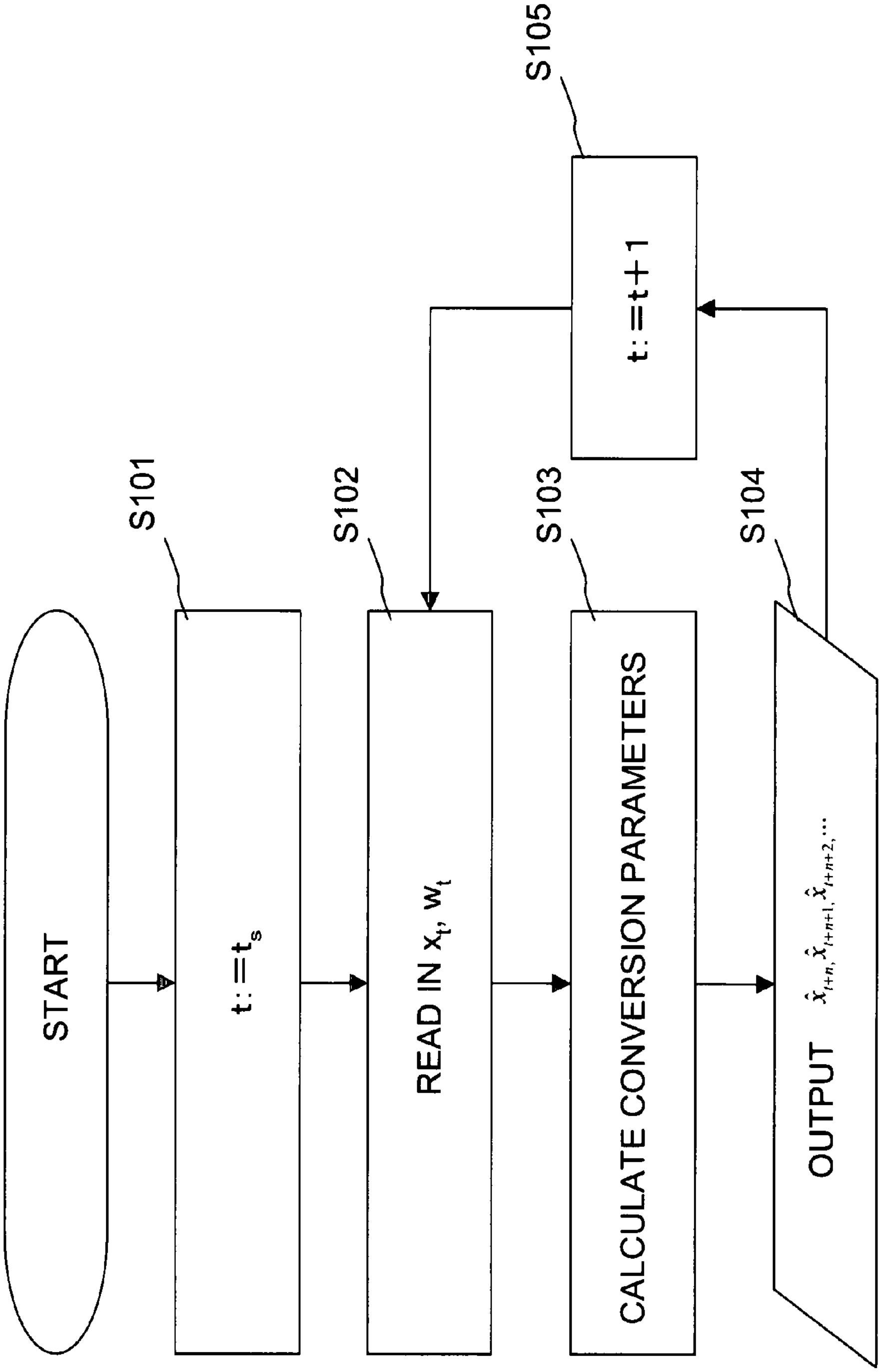
FIG. 5 is a flowchart illustrating the flow of processing executed in a travel-time prediction apparatus according to the first embodiment.

FIG. 5 is a flowchart illustrating the flow of processing executed in the travel-time prediction apparatus 100 according to this example. First, as shown in FIG. 5, the travel-time prediction apparatus 100 sets the time to present time $t_s$ (step S101).

Next, the travel-time prediction apparatus 100 reads out a travel-time transition pattern $w_t$, which corresponds to the travel-time realtime data 101, specified link and time, from the travel-time transition pattern database 104 (step S102). The above-mentioned conversion parameters that specify the conversion of the travel-time transition pattern are calculated by the pattern conversion means 102 and are output to the predicted-value calculation means 103 (step S103).

Next, the travel-time prediction apparatus 100 outputs predicted values $\hat{x}_{t+n}$, $\hat{x}_{t+n+1}$, $\hat{x}_{t+n+2}$, . . . using the prediction function obtained by the conversion employing the above-mentioned conversion parameters (step S104).

Thus, in accordance with this example, it is possible to estimate travel time accurately using a prediction function obtained by a conversion performed so as to reduce the error between past data and a present actually measured value with regard to a specified prediction-target link.

Second Example

Next, a second example of the invention obtained by modifying the first example will be described in detail with reference to the drawings.

A travel-time pattern expressed by a step-shaped function with respect to the time axis is incapable of being differentiated. In order to find a combination of (a,b) that will minimize error, it is necessary to perform calculations using all combinations of (a,b) and to select the combination for which the error is smallest. This involves an enormous amount of calculation.

Accordingly, in this example, the processing (see step S103 in FIG. 5) for calculating conversion parameters in the first example is modified and a method of obtaining the best solution with a limited amount of data without using differentiation is adopted, thereby reducing calculation time while maintaining prediction accuracy.

Figure 6:
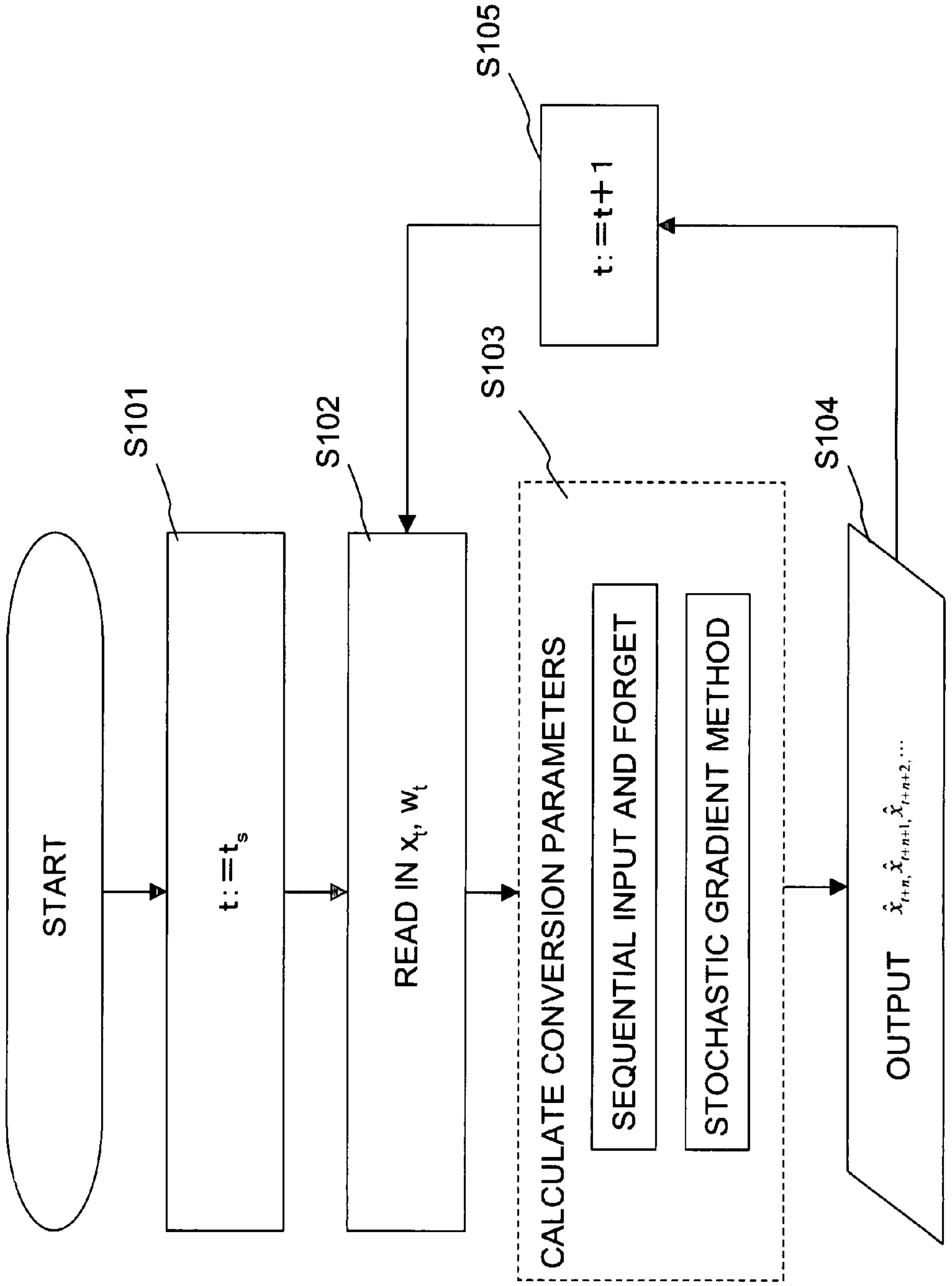
FIG. 6 is a flowchart illustrating the flow of processing executed in the travel-time prediction apparatus according to a second embodiment of the present invention.

FIG. 6 is a flowchart illustrating the flow of processing executed in the travel-time prediction apparatus 100 according to this example. The difference between this processing and the processing by the travel-time prediction apparatus 100 of the first example is that the latest serially input data over a fixed period of time is used in the processing (step S103) for calculating the conversion parameters ("sequential input and forget) and in that it is so arranged that the best solution is obtained by a stochastic gradient method ("stochastic gradient method" in FIG. 6).

Figure 7:
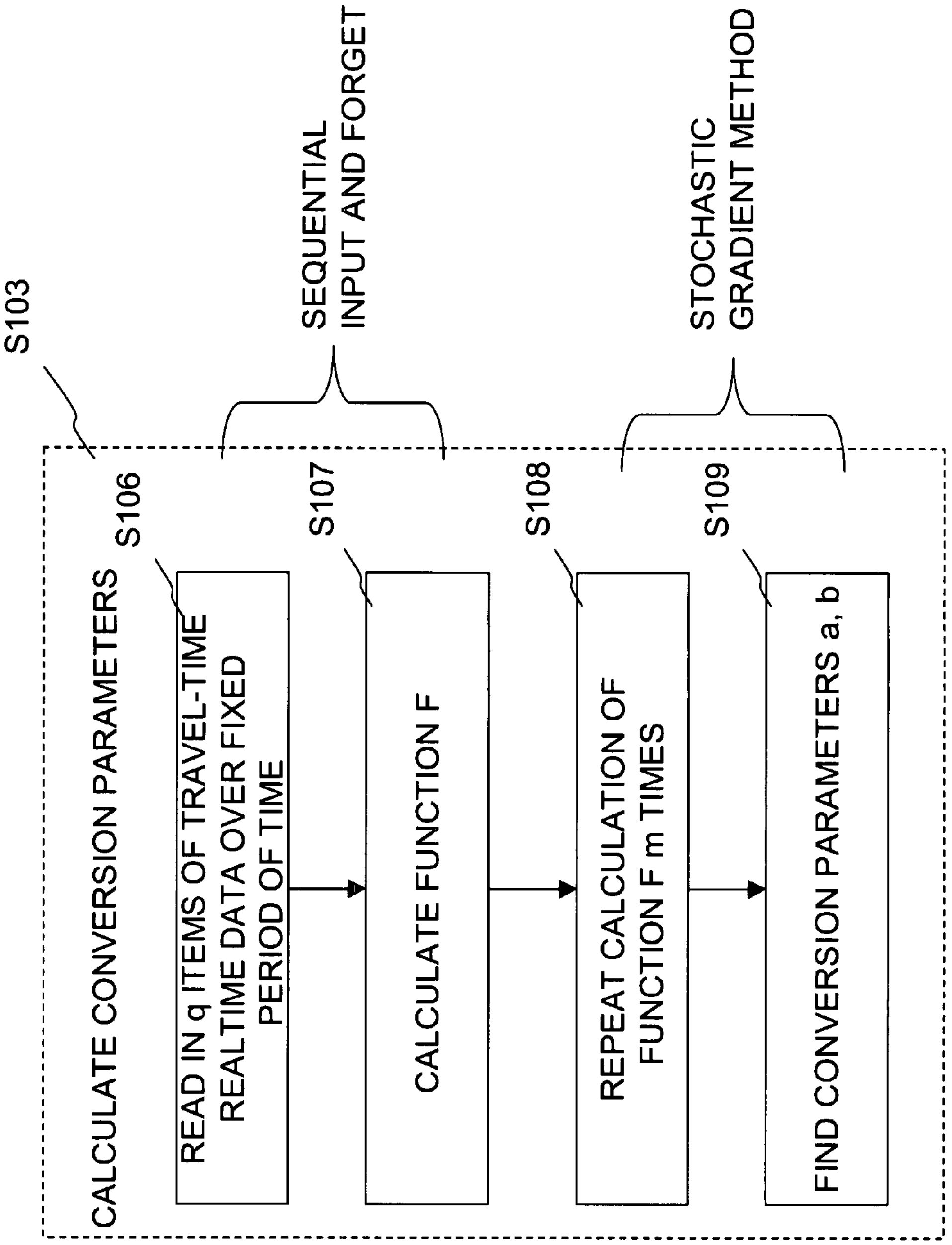
FIG. 7 is a flowchart illustrating the details of conversion parameter calculation processing in a travel-time prediction apparatus according to the second embodiment.

The details of processing for calculating conversion parameters will be described with reference to FIG. 7. As shown in FIG. 7, first the travel-time prediction apparatus 100 reads in q items of data, which exist in a past fixed period of time (e.g., a period up to 10 to 15 minutes prior to the present time $t_s$), from the travel-time realtime data 101 (step S106) and calculates a function F, which is expressed by the equation below, from the data read in (step S107).

$$F(a, b) = (1/q)\sum_{i=1}^{q}(x_i - h(u_i \mid \exp(a), b))^2 + w_a a^2 + w_b b^2 \quad \text{(Eq. 5)}$$

In order to make sequential input of data possible, the function F is obtained by approximately converting Equation (6) below, which is the error term and penalty terms of Equation (1). A feature of this conversion is that the travel-time transition pattern is not multiplied by a constant (by a factor of a) but by exp(a).

$$\Sigma(x_u - h(u|a,b))^2 + w_a(1-a)^2 + w_b b^2) \quad \text{(Eq. 6)}$$

More specifically, the travel-time prediction apparatus 100 calculates the function F in the following five patterns to which provisional fluctuation ranges $d_1$, $e_1$ have been applied (added to or subtracted from)/not applied to initial conversion parameters ($a_1$, $b_1$), as described below:

$(a_1,b_1)$ $(a_1+d_1,b_1)$ $(a_1b_1+e_1)$ $(a_1-d_1,b_1)$ $(a_1,b_1-e_1)$

The travel-time prediction apparatus 100 randomly selects combinations of the constant-multiple parameter a and translation parameter b from the following nine combinations based upon a probability proportional to the size of error from the results of calculating the above-mentioned five patterns of function F, and adopts ($a_2$, $b_2$) as the selected combination:

$(a_1,b_1)$ $(a_1+d_1,b_1)$ $(a_1b_1+e_1)$ $(a_1-d_1,b_1)$ $(a_1,b_1-e_1)$ $(a_1+d_1,b_1+e_1)$ $(a_1+d_1,b_1-e_1)$ $(a_1-d_1,b_1+e_1)$ $(a_1-d_1,b_1-e_1)$

The travel-time prediction apparatus 100 repeats, m times (where m is set in advance in accordance with the processing capability, etc., of the travel-time prediction apparatus 100), calculation of the function F of a plurality of patterns to which the fluctuation ranges $d_n$, $e_n$ (n=1 to m) have been applied, as described above, and selection of provisional constant-multiple parameter $a_n$ and provisional translation parameter $b_n$ (n=1 to m) that are based upon the results of the calculations (step S108), and narrows down the optimum (a, b) (step S109).

Here the fluctuation ranges $d_n$, $e_n$ (n=1 to m) are assumed to be $d_1 \geqq d_2 \geqq \ldots d_m$, $e_1 \geqq e_2 \geqq \ldots \geqq e_m$ and are set in conformity with the required prediction accuracy of travel time in such a manner that the steps become progressively finer as the number m of computations increases.

In a case where prediction processing is executed again, t is updated by the operation t:=t+1 (step S105) in accordance with the flow of FIG. 6 and the conversion parameters are calculated (step S103).

At the processing (step S106) for reading in the travel-time realtime data at the next time t+1, only the data updated in the time period from time t to time t+1 is read in and calculation of the function F is performed using the latest q items of data inclusive of this data (step S107). As a result, the data read in is reduced and processing speed rises.

Further, prediction accuracy is maintained by thus sequentially inputting the latest q items of data without using old data (i.e., while forgetting the old data). As a result of the foregoing, high-speed processing is realized without using differentiation and by reducing the data that is read in.

According to this example, as described above, prediction of travel time is possible with respect to a road over a broad range with a diminished amount of calculation. This means that the system is readily installed in a vehicle in which a plurality of high-performance processing devices are difficult to install because of space limitations.

Third Example

Next, a third example of the invention obtained by modifying the arrangement of the first example will be described in detail with reference to the drawings. The travel-time prediction apparatus according to this example is obtained by providing the arrangement of the first example with a plurality of prediction means, namely long-term prediction means and short-term prediction means, and with a high-speed prediction function for selecting the ideal prediction means from among these prediction means and performing real-time prediction in the appropriate cycle (five minutes to one hour). Primarily the additions to and modifications of the first example will now be described in detail.

Figure 8:
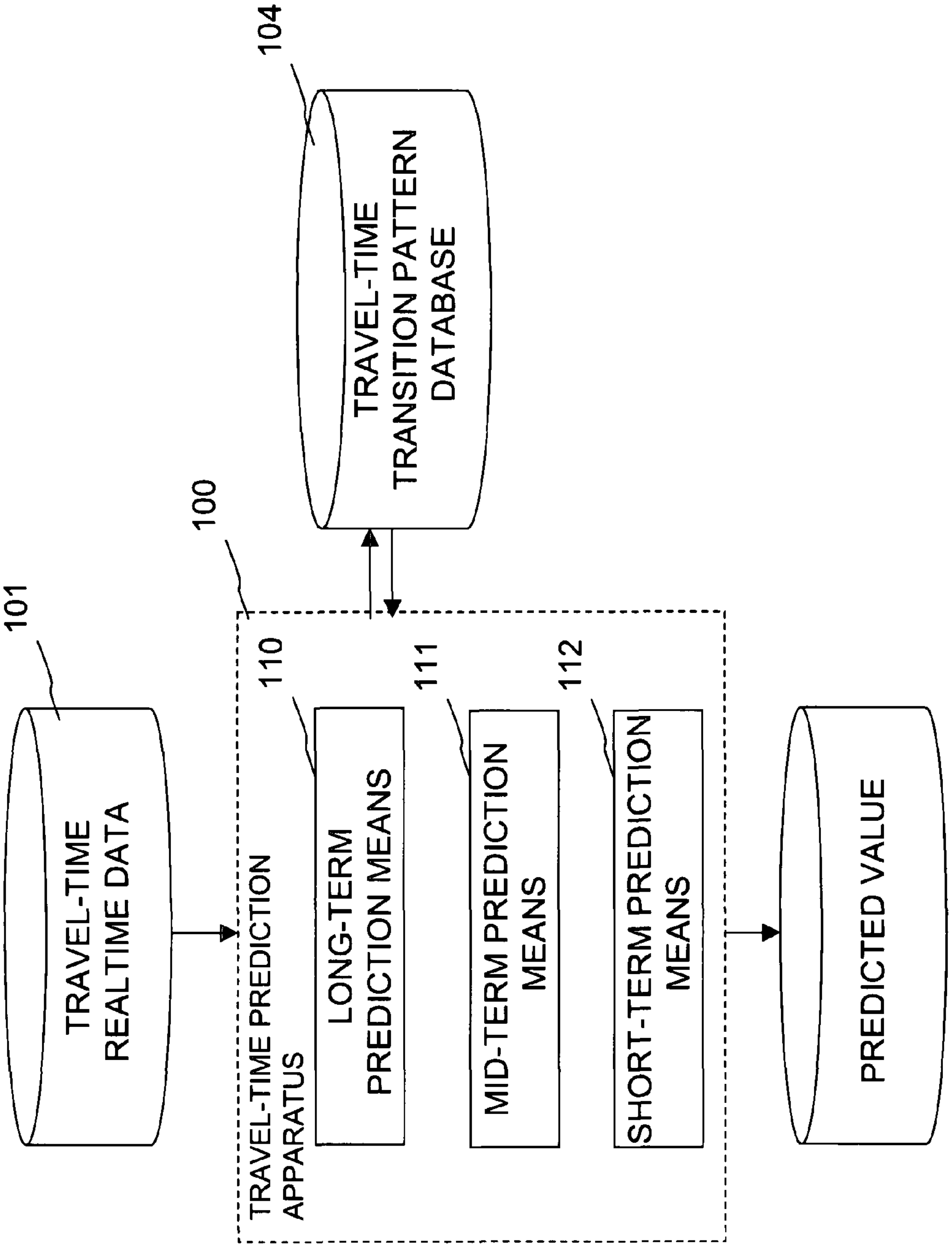
FIG. 8 is a diagram illustrating the overall configuration of a travel-time prediction system according to a third embodiment of the present invention.

FIG. 8 is a diagram illustrating the configuration of the travel-time prediction apparatus 100 according to this example. As shown in FIG. 8, the travel-time prediction apparatus 100 includes mid-term prediction means 111, which is composed of the pattern conversion means 102 and predicted-value calculation means 103 of the first example, as well as long-term prediction means 110 and short-term prediction means 112.

Long-Term Prediction

The long-term prediction means 110 executes long-term prediction processing using only the stored data in the travel-time transition pattern database 104 and not the travel-time realtime data 101. The reason for this is that in traffic information, the influence of the present conditions on the future is several hours at most and hence the use of realtime data is meaningless with regard to predictions farther ahead than this.

Short-Term Prediction

The short-term prediction means 112 executes short-term prediction processing that is based upon an autoregression (AR) model. Here it is assumed that the short-term prediction is one that predicts a maximum of one hour ahead using the travel-time realtime data 101 of the past one hour. Although it is possible to use various methods in short-term prediction, it is preferred that use be made of the method described in Patent Document 3 filed by the present applicant, the entire disclosure thereof being incorporated herein by reference thereto.

An overview of the method described in Patent Document 3 that uses the autoregression model will be described below as it relates to the selection of prediction means, described later.

Let the difference $y_t$ between the travel-time realtime data and the travel-time transition pattern be expressed by $y_t=x_t-w_t$. The autoregression model is a statistical model that defines a probability distribution produced by the travel-time realtime data. The model can be expressed as follows:

$$y_{t+1}=\sum_{m=1}^{k}a_m y_{t+1-m}+\epsilon_t \quad \text{(Eq. 7)}$$

Here $\epsilon_t$ represents a noise term and is assumed generally to be a multidimensional normal distribution the average of which is zero. Further, $a_m$ is referred to as an "AR coefficient". In order to specify one of these models, it will suffice to specify all AR coefficients and a dispersion that defines the probability distribution of $\epsilon_1$. These parameters are referred to collectively as θ. If θ has been specified, then travel time into the immediate future can be predicted from the past data by the following equation:

$$\hat{y}_{t+1}=\sum_{m=1}^{k}a_m y_{t+1-m}+\epsilon_t \quad \text{(Eq. 8)}$$

Further, estimating θ based upon past data is a learning problem, and it is necessary that learning be performed in advance with regard to all links.

[Selection of Prediction Processing]

The travel-time prediction apparatus 100 according to this example has a function for determining an appropriate prediction method for every link by utilizing the above-mentioned three types of prediction means and the acquired readtime data, and executing effective prediction processing using this method.

First, the period of time that is the target of each prediction is decided beforehand. For example, if the time is the present time $t_0$, then the time period is the target of short-term prediction with regard to $1\leqq t\leqq t_0+6$, the time period is the target of mid-term prediction with regard $t_0+7\leqq t\leqq t_0+25$, and the value of travel-time transition pattern database 104 is output as is from then onward (long-term prediction).

If the time interval is five minutes, the above-mentioned rule means that short-term prediction is made from the present time to 30 minutes hence, mid-term prediction is made from then to 120 minutes hence, and long-term prediction is made from then onward.

The travel-time prediction apparatus 100 according to this example moreover determines whether to perform short-term and mid-term prediction or use the value from the travel-time transition pattern database 104 as is with regard to the period of time that is the target of short-term and mid-term prediction.

In a case where an autoregression model is used with regard to a short-term prediction, realtime data that goes back in time by the order of the autoregression model is necessary in order to carry out the prediction. For example, in a case where an autoregression model of order m is used, travel-time realtime data in a period corresponding to $t_0-m\leqq t\leqq t_0$ is required.

When the difference between the travel-time realtime data 101 in this period and the value from the travel-time transition pattern database 104 is large, the travel-time prediction apparatus 100 according to this example activates the short-term prediction algorithm; otherwise, the apparatus makes the prediction using the value from the travel-time transition pattern database 104 as is.

For example, in a case where the quantity indicated below is greater than a predetermined threshold value $\Delta_s$, the apparatus makes the short-term prediction. Otherwise, the apparatus does not make the prediction.

$$\sqrt{\frac{1}{m+1}\sum_{t_0-m}^{t_0}(w_t-x_t)^2} \quad \text{(Eq. 9)}$$

It will suffice if the specific value of $\Delta_S$ is determined by the required accuracy of travel time. For example, if an accuracy of one minute is required, then the value is made one minute, thereby enabling a travel time based upon the above-mentioned short-term prediction to be output only when necessary.

Similarly, with regard to mid-term prediction, travel-time realtime data in a period corresponding to $t_0$ $t_0-1/\alpha\leqq t\leqq t_0$ is required. In this case also, whether it is necessary to execute the mid-term prediction or not can be determined depending upon whether a quantity obtained by substituting $1/\alpha$ for m in Equation (7) is larger than a predetermined value $\Delta_M$. It will suffice if $\Delta_M$ also is determined by accuracy in a manner similar to $\Delta_S$. However, since a mid-term prediction generally cannot be expected to have an accuracy higher than that of a short-term prediction, setting $\Delta_M$ to be several times larger than $\Delta_S$ (e.g., to five minutes) is appropriate.

By thus setting $\Delta_S$ and $\Delta_M$ appropriately, the computation cost involved in prediction processing can be controlled.

[Grouping of Prediction Processing]

By way of example, it can be expected that travel-time realtime data relating to two successive links on the same road will have statistical properties having a high degree of resemblance in many cases. The same is true with regard to links on two parallel roads. In particular, when the difference between travel-time realtime data and a travel-time transition pattern is considered, road-specific properties are smoothed out and a greater degree of correlation can be expected. The travel-time prediction apparatus 100 according to this example subjects a set of links to clustering beforehand based upon a value from the travel-time transition pattern database 104 and groups links that indicate similar tendencies.

Further, the apparatus decides a single representative link with regard to each group. If conversion parameters $\lfloor\hat{a}(t_0),\hat{b}(t_0)\rfloor$ used in mid-term prediction are found with regard solely to this representative group, then it will be possible for the apparatus to make a prediction regarding a link belonging to the group. This is advantageous, particular for mid-term prediction, in two points, namely the fact that it is possible to make a prediction also with regard to a link for which realtime data is not obtained at the present time (this in turn essentially makes it possible to apply predictions to roads throughout the entire country), and in that computation time can be curtailed.

It is necessary that this clustering be performed with regard to all links to undergo prediction. However, since there is considered to be no correlation between links that are geographically remote from each other, it will suffice to execute processing only in a geographical region that has been formed into a block. For example, clustering can be facilitated by holding travel-time transition patterns in the form of a hierarchical structure (geographical_region/secondary_mesh/linkgroup/link/) that takes these geographical relationships into consideration. Further, thus managing travel-time transition patterns in the form of a hierarchical structure is advantageous in terms of load variance and expandability.

Further, the above-described clustering processing basically need only be executed one time as pre-processing and it need not be executed in realtime. As examples of specific clustering methods, use can be made of classical methods such as the Ward Method or k-means method [e.g., "A Survey of Recent Clustering Methods for Data Mining (part 1)—Try Clustering!—" by Toshihiro Kamishima, Artificial Intelligence Society Magazine, vol. 18, no. 1, pp. 59-65 (2003), and SOM (Self-Organized Map) proposed in the publication "Self-Organizing Maps" by T. Kohonen, Springer-Verlag, Berlin, 2001], the entire disclosure thereof being incorporated herein by reference thereto.

[Scheduling of Prediction Processing]

The operation (scheduling of prediction processing) of the travel-time prediction apparatus 100 according to this example will be described next.

Figure 9:
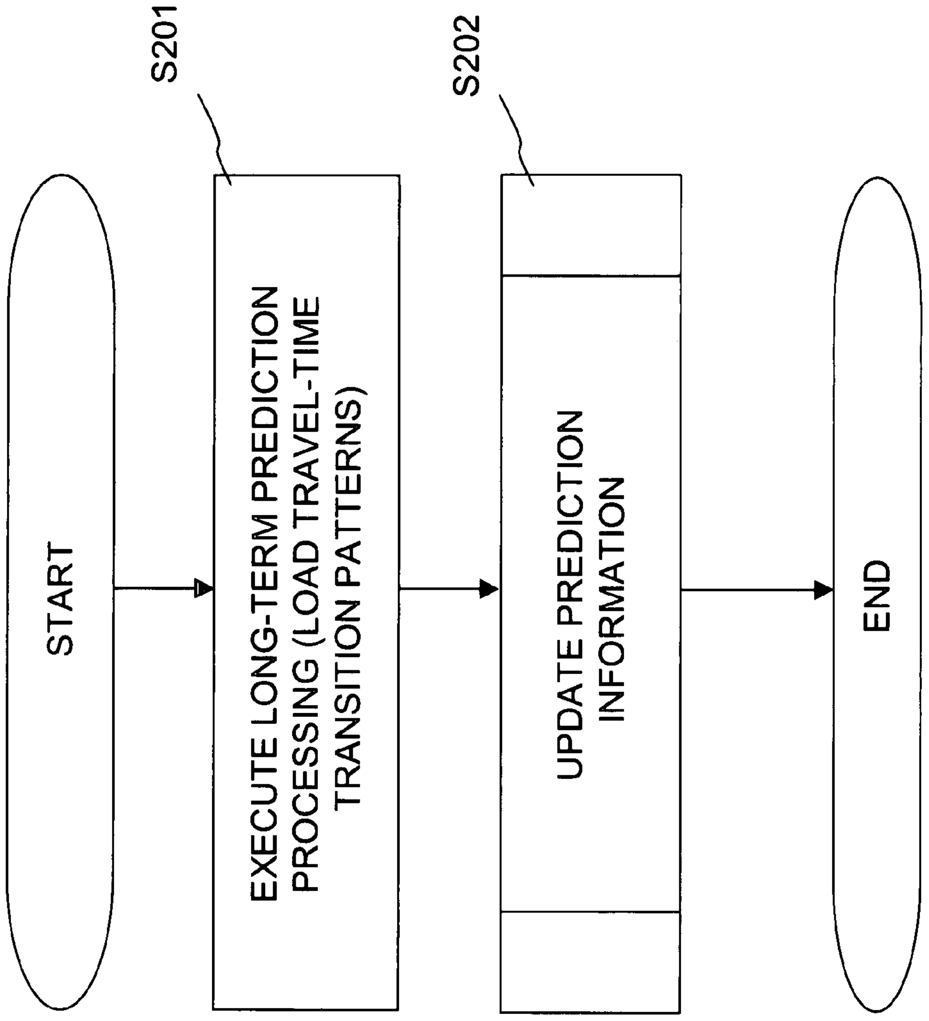
FIG. 9 is a flowchart illustrating the flow of processing executed in a travel-time prediction apparatus according to the third embodiment.
Figure 10:
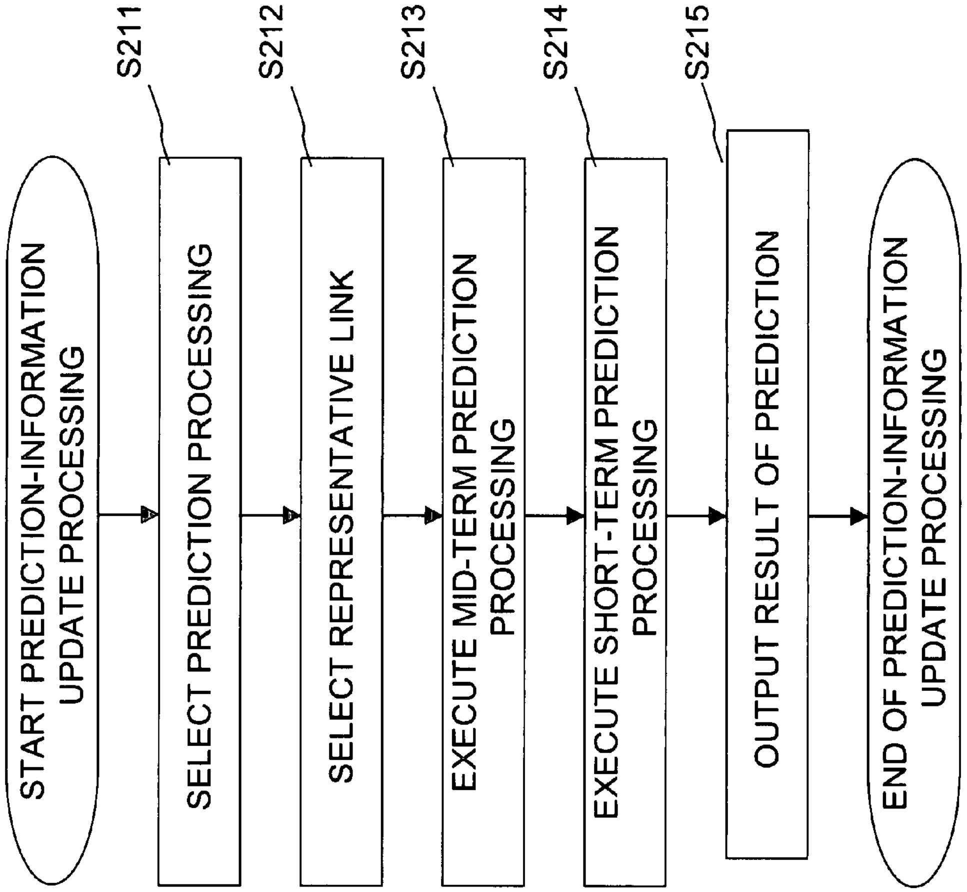
FIG. 10 is a flowchart illustrating the flow of processing executed in a travel-time prediction apparatus according to the third embodiment.

FIGS. 9 and 10 are flowcharts illustrating the operation (scheduling of prediction processing) of the travel-time prediction apparatus 100 according to this example. With reference to FIG. 9, the travel-time prediction apparatus 100 loads the required travel-time transition patterns from the travel-time transition pattern database 104 in accordance with the set of links to undergo prediction and the prediction-target time (step S201).

Next, the travel-time prediction apparatus 100 periodically executes prediction-information update processing shown in FIG. 10 (step S202).

With reference to FIG. 10, first the travel-time prediction apparatus 100 determines whether short-term prediction and mid-term prediction are each necessary based upon travel-time realtime data up to the present time, the travel-time transition patterns loaded at step S201 and the prediction-target time (step S211).

The travel-time prediction apparatus 100 selects a representative link from a group to which the prediction-target link belongs (step S212).

If it has been determined at step S211 that a mid-term prediction is required, then the travel-time prediction apparatus 100 executes mid-term prediction processing (step S213). Similarly, if it has been determined at step S211 that a short-term prediction is required, then the travel-time prediction apparatus 100 executes short-term prediction processing (step S214).

Finally, the travel-time prediction apparatus 100 combines the results of the predictions and outputs the result of travel-time prediction that corresponds to the prediction-target link and prediction-target time (step S215).

According to this example, as described above, the advantages of short-, mid- and long-term predictions are combined, as set forth in the section "Selection of prediction processing". This makes it possible to obtain prediction results in which a prescribed accuracy is assured with a small amount of computation. Further, as set forth in the section "Grouping of prediction processing", it is also possible to make predictions regarding a route that includes a link (a segment of road) over which it is substantially impossible to obtain realtime data in view of circumstances such as cost.

Further, in terms of route selection and the provision of secondary information services to users, the highly accurate prediction data calculated as set forth above is useful information to individual drivers and to various transport companies such as trucking businesses, taxi companies and bus companies that transport tourists and goods.

It is possible to perform traffic information services using a traffic information providing system having means for providing results of travel-time prediction that have been output from the travel-time prediction apparatus 100 described above. Such information content can be distributed for a fee, in view of the utility thereof, by any billing system such as fixed payment system, in which a certain distribution period has been decided, or a pay-as-you-go system that conforms to the number of times information is distributed or to the size of distribution, etc. Alternatively, by distributing such information in combination with prescribed advertisements, it is possible to distribute the information for free if the commercial sponsor of the advertisements is made to bear the system running cost.

Furthermore, it is permissible to distribute not only the results of predicting travel time but also the above-mentioned conversion parameters with the addition of explanatory notes.

Though the present invention has been described in accordance with the foregoing examples, the invention is not limited to these examples and it goes without saying that the invention covers various modifications and changes that would be obvious to those skilled in the art within the scope of the claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A travel-time prediction apparatus, to which are input a link specified as a prediction target from a set of all links, date and time of the prediction target and travel-time time-series data that is input sequentially in relation to the specified link, for outputting predicted travel time in the specified link and at the date and time, wherein said apparatus comprises:

- a database that stores travel-time transition patterns obtained by statistically processing past time-series data of each link according to at least day type, said data base supplying a travel-time transition pattern corresponding to the specified link and day type;
- a conversion parameter calculating unit that calculates conversion parameters of a travel-time transition pattern for which an error between the travel-time transition pattern and sequentially input travel-time time-series data will be reduced, wherein calculation is performed of conversion parameters of a travel-time transition pattern for which the sum of a penalty term and a weighted error between the travel-time transition pattern and the sequentially input travel time will be reduced; and
- a prediction unit that makes a prediction using a prediction function obtained by converting the travel-time transition pattern by the calculated conversion parameters.

2. The apparatus according to claim 1, wherein said apparatus optimizes a weighting coefficient of the weighted error and the size of the penalty term by reducing predictive stochastic complexity.

3. The apparatus according to claim 1, wherein calculation is performed of at least a constant-multiple parameter and a translation parameter of the travel-time transition pattern as the conversion parameters.

4. The apparatus according to claim 1, wherein calculation is performed of at least a vertical-displacement parameter and a translation parameter of the travel-time transition pattern as the conversion parameters.

5. The apparatus according to claim 1, wherein on the basis of probability of appearance of an error between a prescribed number of items of serially input travel-time time-series data measured in a fixed past period of time and a predicted value calculated using provisional conversion parameters of a plurality of patterns to which provisional fluctuation ranges determined so as to diminish with each computation have been applied/not applied, said apparatus repeats updating of the provisional conversion parameters and calculation of the error a prescribed number of times, thereby deciding conversion parameters of the travel-time transition pattern.

6. The apparatus according to claim 1, comprising short-term prediction means for making a short-term prediction of travel time up to a prescribed time ahead utilizing an autoregression model;

wherein a mid-term prediction of travel time using the prediction function is made with regard to a portion that exceeds the prediction range of said short-term prediction means.

7. The apparatus according to claim 6, wherein in each of the short- and mid-term predictions, said apparatus executes a prediction only when there is a significant difference between the serially input travel-time time-series data and a travel-time transition pattern that has been stored in the database.

8. The apparatus according to claim 6, wherein said apparatus groups all prediction-target links into groups determined in advance and obtains the conversion parameters with regard to a representative link per each group; and makes a prediction using values of the conversion parameters with respect to a link belonging to a group the same as that of the representative link.

9. A traffic information providing system, comprising:

a travel-time prediction apparatus, to which are input a link specified as a prediction target from a set of all links, date and time of the prediction target and travel-time time-series data that is input sequentially in relation to the specified link, for outputting predicted travel time in the specified link and at the date and time, wherein said apparatus comprises:

a database that stores travel-time transition patterns obtained by statistically processing past time-series data of each link according to at least day type, said data base supplying a travel-time transition pattern corresponding to the specified link and day type;

a conversion parameter calculating unit that calculates conversion parameters of a travel-time transition pattern for which an error between the travel-time transition pattern and sequentially input travel-time time-series data will be reduced, wherein calculation is performed of conversion parameters of a travel-time transition pattern for which the sum of a penalty term and a weighted error between the travel-time transition pattern and the sequentially input travel time will be reduced; and a prediction unit that makes a prediction using a prediction function obtained by converting the travel-time transition pattern by the calculated conversion parameters; and means for providing traffic information connected to the travel-time prediction apparatus, which includes the predicted travel time that has been output from said travel-time prediction apparatus, to a prescribed terminal.

10. The system according to claim 9, further comprising billing means of a fixed payment system in which a traffic information distribution period has been decided.

11. The system according to claim 9, further comprising billing means of a pay-as-you-go system that conforms to the number of times traffic information is distributed.

12. The system according to of claim 9, wherein values of the conversion parameters used in conversion of the prediction function are provided together with the traffic information.

13. A travel-time prediction method using a computer, to which are input a link specified as a prediction target from a set of all links, date and time of the prediction target and travel-time time-series data that is input sequentially in relation to the specified link, for outputting predicted travel time in the specified link and at the date and time, said method comprising the following steps executed by the computer:

accepting a travel-time transition pattern corresponding to the specified link and type of day from a database storing travel-time transition patterns obtained by statistically processing past time-series data of each link according to at least day type;

calculating conversion parameters of a travel-time transition pattern for which an error between the travel-time transition pattern and sequentially input travel-time time-series data will be reduced, wherein calculating is performed of conversion parameters of a travel-time transition pattern for which the sum of a penalty term and a weighted error between the travel-time transition pattern and the sequentially input travel time will be reduced;

obtaining a prediction function by converting the travel-time transition pattern by the calculated conversion parameters; and predicting and outputting predicted travel time in the specified link and at the date and time using the prediction function.

14. A program executed by a computer, to which are input a link specified as a prediction target from a set of all links, date and time of the prediction target and travel-time time-series data that is input sequentially in relation to the specified link, for outputting predicted travel time in the specified link and at the date and time, said program causing the computer to execute the following processing:

processing for accepting a travel-time transition pattern corresponding to the specified link and type of day from a database storing travel-time transition patterns obtained by statistically processing past time-series data of each link according to at least day type;

processing for calculating conversion parameters of a travel-time transition pattern for which an error between the travel-time transition pattern and sequentially input travel-time time-series data will be reduced, wherein processing for calculating is performed of conversion parameters of a travel-time transition pattern for which the sum of a penalty term and a weighted error between the travel-time transition pattern and the sequentially input travel time will be reduced;

processing for obtaining a prediction function by converting the travel-time transition pattern by the calculated conversion parameters; and processing for predicting and outputting predicted travel time in the specified link and at the date and time using the prediction function.

* * * * *